(12) United States Patent
Kondo

(10) Patent No.: US 10,989,228 B2
(45) Date of Patent: Apr. 27, 2021

(54) NON-CLOGGING AIRLIFT PUMPS AND SYSTEMS AND METHODS EMPLOYING THE SAME

(71) Applicant: Pulsed Burst Systems, LLC, Milwaukee, WI (US)

(72) Inventor: Masao Kondo, West Chester, OH (US)

(73) Assignee: PULSED BURST SYSTEMS, LLC, Milwaukee, WI (US)

( * ) Notice: Subject to any disclaimer, the term of this patent is extended or adjusted under 35 U.S.C. 154(b) by 166 days.

(21) Appl. No.: 16/022,247

(22) Filed: Jun. 28, 2018

(65) Prior Publication Data

US 2018/0353916 A1 Dec. 13, 2018

Related U.S. Application Data

(62) Division of application No. 14/195,676, filed on Mar. 3, 2014, now abandoned.

(60) Provisional application No. 61/771,781, filed on Mar. 1, 2013.

(51) Int. Cl.
| | |
|---|---|
| *F04F 1/00* | (2006.01) |
| *B01F 13/02* | (2006.01) |
| *F04F 1/08* | (2006.01) |
| *B01F 5/10* | (2006.01) |
| *B01D 21/24* | (2006.01) |

(52) U.S. Cl.
CPC ............... *F04F 1/00* (2013.01); *B01F 5/108* (2013.01); *B01F 13/0222* (2013.01); *F04F 1/08* (2013.01); *B01D 21/2466* (2013.01); *Y10T 137/86035* (2015.04)

(58) Field of Classification Search
CPC ........ F04F 1/00; F04F 1/05; F04F 1/08; F04F 1/18; F04F 1/20; F04F 1/06; B01F 5/108; B01F 13/0222; B01D 21/2466; Y10T 137/86035

See application file for complete search history.

(56) References Cited

U.S. PATENT DOCUMENTS

| | | | | |
|---|---|---|---|---|
| 1,339,137 | A | | 5/1920 | Rogers |
| 1,741,571 | A | * | 12/1929 | Ives ......................... F04F 1/18 417/108 |
| 3,133,507 | A | | 5/1964 | Der Ster |
| 3,289,609 | A | | 12/1966 | Palo |
| 3,542,490 | A | * | 11/1970 | Gare ......................... F04F 1/18 417/108 |
| 4,092,087 | A | | 5/1978 | Anthony et al. |
| 5,312,232 | A | * | 5/1994 | Horton ...................... F04F 1/18 417/108 |
| 5,534,141 | A | * | 7/1996 | McAnaney ........ B01D 21/0027 210/110 |

(Continued)

*Primary Examiner* — Alexander B Comley

(74) *Attorney, Agent, or Firm* — Rathe Lindenbaum LLP

(57) ABSTRACT

Non-clogging airlift pumps and associated systems and methods employing said pumps. The airlift pumps generally include an enclosed air tank within which is located a hollow cylinder having an open top and a closed bottom wall. A gas (e.g., air) line passes into the air tank for supplying gas thereto. A suction port is located in the bottom wall of the cylinder, and a substantially vertically-oriented discharge pipe passes through a top wall of the air tank such that an intake end of the discharge pipe resides within the cylinder. Multiple airlift pumps may be used in conjunction in a given application.

11 Claims, 16 Drawing Sheets

(56) References Cited

U.S. PATENT DOCUMENTS

| | | | |
|---|---|---|---|
| 5,609,754 A * | 3/1997 | Stuth | C02F 3/04 210/151 |
| 6,048,175 A * | 4/2000 | Corlew | F04F 1/08 417/120 |
| 6,162,020 A * | 12/2000 | Kondo | C02F 3/223 417/54 |
| 6,190,555 B1 | 2/2001 | Kondo | |
| 6,234,761 B1 * | 5/2001 | Kocsis | F04F 1/06 417/118 |
| 6,969,465 B2 | 11/2005 | Zha et al. | |
| 7,267,328 B2 | 9/2007 | Witheridge | |
| 7,294,255 B2 * | 11/2007 | Kondo | C02F 3/12 210/151 |
| D637,208 S | 5/2011 | Zauner et al. | |
| 8,047,808 B2 * | 11/2011 | Kondo | F04F 1/18 417/137 |
| 8,137,557 B2 | 3/2012 | Ladouceur | |
| 8,371,826 B1 | 2/2013 | Johnson et al. | |
| 2007/0166171 A1 | 7/2007 | Kondo | |
| 2010/0000941 A1 | 1/2010 | Muller | |
| 2010/0170847 A1 | 7/2010 | Zha et al. | |
| 2011/0049047 A1 | 3/2011 | Cumin et al. | |
| 2011/0100907 A1 | 5/2011 | Zha et al. | |
| 2011/0198283 A1 | 8/2011 | Zha et al. | |
| 2011/0309034 A1 * | 12/2011 | Yousfan | B01F 15/00396 210/758 |
| 2012/0048801 A1 | 3/2012 | Hong et al. | |
| 2012/0061333 A1 | 3/2012 | Zha et al. | |
| 2012/0325742 A1 | 12/2012 | Cumin et al. | |

\* cited by examiner

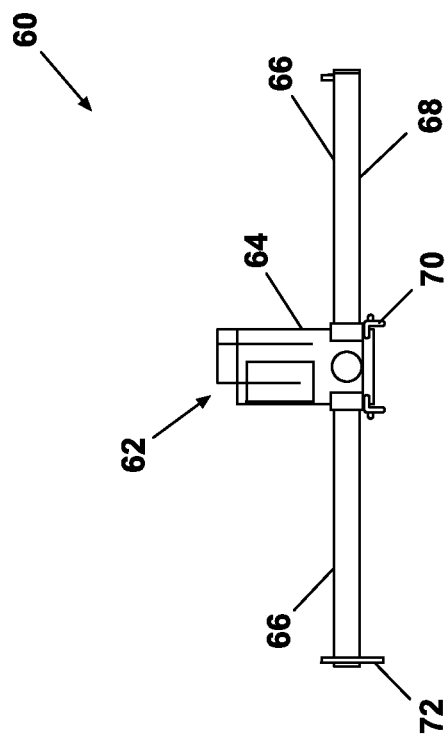
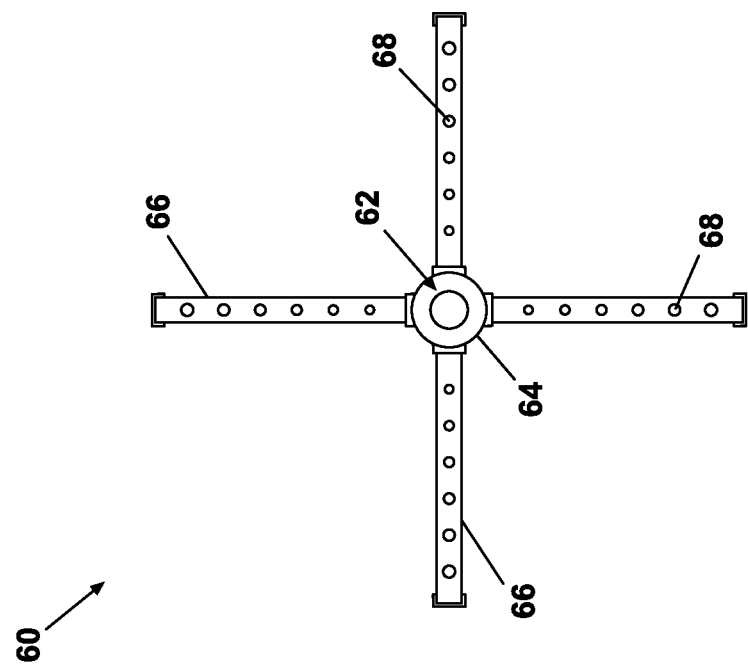

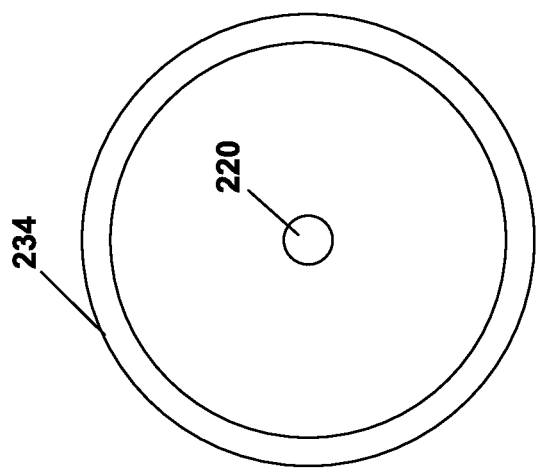
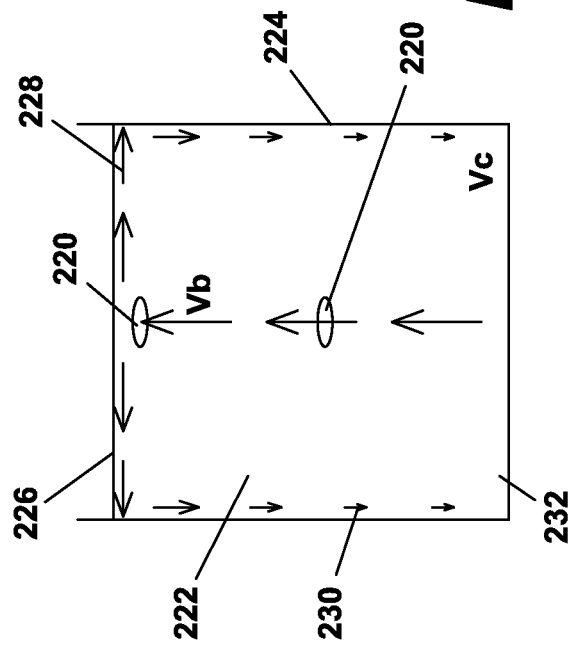
FIG. 15A
FIG. 15B

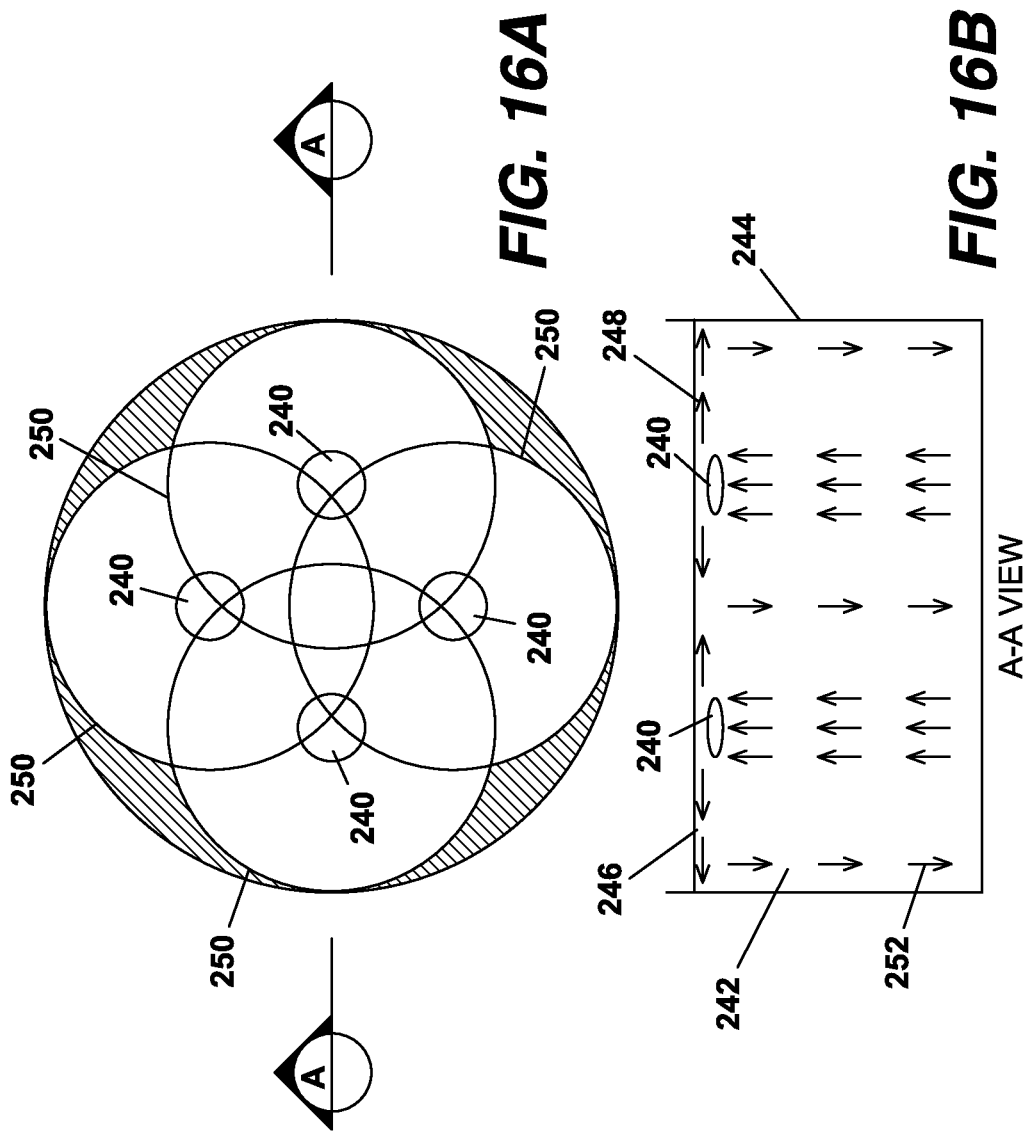

NON-CLOGGING AIRLIFT PUMPS AND SYSTEMS AND METHODS EMPLOYING THE SAME

CROSS-REFERENCE TO RELATED PATENT APPLICATIONS

This application is a divisional of U.S. patent application Ser. No. 14/195,676 entitled NON-CLOGGING AIRLIFT PUMPS AND SYSTEMS AND METHODS EMPLOYING THE SAME filed Mar. 3, 2014, which claims the benefit of U.S. Provisional Application No. 61/771,781, entitled NON-CLOGGING AIRLIFT PUMP filed Mar. 1, 2013, both of which are incorporated herein by reference in their entirety.

TECHNICAL FIELD

Embodiments of the invention are directed airlift pumps of non-clogging design and the use of such airlift pumps in various applications.

BACKGROUND

An airlift pump may be generally described as a submersible device that is supplied with a pressurized gas (e.g., air) to produce buoyant forces that act to lift a liquid within which the pump is submerged. More particularly, an airlift pump typically includes an open-ended and vertically-oriented riser tube. A lower end of the riser tube is normally submerged in a liquid to be pumped, and may reside within a chamber that is also submerged. Gas (typically air) is introduced into the liquid and commonly into such a chamber which, when present, acts as an air tank. Continued introduction of gas into the liquid eventually causes the average density of the air-liquid mixture in the riser tube to become less than the density of the surrounding liquid. This creates a buoyant force that pushes (pumps) the air-liquid mixture upward through the riser tube where is expelled from the open top thereof.

One exemplary and known airlift pump is disclosed in U.S. Pat. No. 6,162,020 to the present inventor. As shown and described therein, and as represented schematically in FIGS. 1A-1C of this application, the airlift pump of U.S. Pat. No. 6,162,020 generally includes an inverted cylindrical chamber (air tank) 6 having a closed top and an open bottom. An airline 5 from an air source (e.g., a compressor or blower) passes through the closed top and into the interior of the air tank 6.

A vertically-oriented discharge pipe 1 also passes through the closed top of the air tank 6. The discharge pipe 1 is of lesser diameter than the air tank 6 and includes an open bottom end that forms a drain port 2 within the air tank. An open top end of the discharge pipe 31 resides outside of the air tank and forms a discharge port 11 for expelling liquid within which the air tank is submerged.

A lateral pipe 4 initially extends substantially transversely (horizontally) from the discharge pipe 1 before turning at a substantially right angle to form a riser tube that runs generally vertically for some distance within the air tank 6. The riser tube portion of the lateral pipe 4 terminates in an open exhaust port 3 at some distance beneath the closed top of the air tank 6.

The air tank 6 along with the drain port 2 and an associated section of the discharge pipe 1, as well as the lateral pipe 4 including the riser tube and exhaust port 3, are submerged in a liquid to be pumped as depicted in FIG. 1A.

To operate the pump, air is then injected into the air tank 6 via the air line 5 at an appropriate flow rate.

The air tank 6 acts as an accumulator during this process. Initially, the lateral pipe 4 remains substantially filled with the liquid. As air continues to be supplied to the air tank 6, however, air 7 accumulates in the air tank and forces the liquid within the air tank downward (as depicted in FIG. 1B).

As schematically illustrated in FIG. 1C, when the liquid level inside the air tank 6 reaches the same level as that of the horizontal section of the lateral pipe 4 that connects the discharge pipe 1 to the riser tube, accumulated air 7 is released through the discharge pipe 1. When the static pressure of the liquid at the bottom of the air tank 6 is strong enough, all the accumulated air 7 is released at once. Since the discharge pipe 1 is filled with liquid prior to the release of the accumulated air 7, an air bubble 8 is formed and rises up the discharge pipe to eject the accumulated air and the liquid in the discharge pipe via the discharge port 11. When all of the accumulated air is released in such a manner, the result is a powerful burst of aerated liquid from the discharge port 11.

When air is continually supplied to the air tank 6 via air line 5, the airlift pump automatically recycles after each burst of aerated liquid. Consequently, accumulated air 7 and liquid are intermittently discharged whenever the liquid level in the air tank 6 is forced down to the level of the horizontal section of the lateral pipe 4 that connects the discharge pipe 1 to the riser tube.

It has been discovered, however, that an airlift pump like that schematically represented in FIGS. 1A-1C works only for pipe diameters of one inch or less, and perhaps three quarters of one inch or less. If the pipe diameter (or at least the diameter of the discharge pipe and drain port) is larger than one inch, intermittent ejection of liquid and air will not result from continuously supplying air to the air tank 6 as described above.

Improper operation of the airlift pump of FIGS. 1a-1c is better illustrated in FIGS. 2A-2C. In the case of the airlift pump schematically shown in FIGS. 2A-2C, the diameter of the discharge pipe 21, suction port 22, exhaust port 23, and lateral pipe 24 has been increased to approximately two inches.

The air tank 6 along with the drain port 22 and an associated section of the discharge pipe 21, as well as the lateral pipe 24 including the riser tube and exhaust port 23, are again submerged in a liquid to be pumped, as depicted in FIG. 2A. When air is initially injected through the air line 5 to the air tank 6, the lateral pipe 24 again remains substantially filled with the liquid. As air continues to be supplied to the air tank 6, however, air 27 accumulates in the air tank and forces the liquid within the air tank downward (as depicted in FIG. 2B).

As schematically illustrated in FIG. 2C, when the liquid level inside the air tank 6 reaches the same level as that of the horizontal section of the lateral pipe 24 that connects the discharge pipe 21 to the riser tube, the accumulated air 27 begins to escape through the discharge pipe 21. Further, because of the increased diameter and relative locations of the discharge pipe 21 and the drain port 22, gravity causes liquid from the discharge pipe, lateral pipe 24 and riser tube to drain 29 through the drain port 22 at a rate that results in continuous bubbling within the discharge pipe 21 instead of the formation of an air pocket that is able to form a large air bubble capable of quickly and forcefully expelling liquid from the discharge pipe. A discharge of some aerated liquid will eventually occur via the discharge port 25 of the discharge pipe 21, however, the discharge of liquid and air occurs with much less force than does a discharge from the airlift pump of FIGS. 1A-1C.

It has also been found that once the liquid in the air tank 6 reaches this level, the air tank is never refilled with liquid. Rather, the liquid level within the air tank 6 remains substantially as shown in FIG. 2C, and air supplied via the air line 5 becomes sufficient to hold down the liquid level such that the air simply flows out of the air tank through the discharge pipe 21. When the discharge end 25 of the discharge pipe 21 is submerged (not shown), liquid will flow into the discharge pipe against the outward flow of supplied air such that the airlift pump will become substantially nothing more than an aerator.

As a result of these issues, the air lift pump of FIGS. 2A-2C cannot adequately pump liquid and does not automatically recycle and produce intermittent bursts of air and liquid as is desired and as occurs with the airlift pump of FIGS. 1A-1C.

While there are applications where it is acceptable to use an airlift pump having a pipe diameter of less than one inch, there are other applications where this is not possible or not practical. For example, it has been determined that when the pipe size is limited to a diameter of one inch or less, the air bubble released from a submerged discharge port, such as in a wastewater tank mixing application, will be less than two inches in diameter. The present inventor has developed a theory of relative bubble velocity that shows a bubble of this size will have limited mixing capability. Therefore, in such a mixing application, the use of an airlift pump with a pipe diameter of greater than one inch is desirable.

It is also desirable to submerge airlift pumps within liquids that may contain sludge and/or other solids or debris. In this regard, it has also been found that the use of an airlift pump having a pipe diameter of less than one inch and having the general design/arrangement shown and described in U.S. Pat. No. 6,162,020 can frequently cause the airlift pump to become clogged with such sludge and/or other material. Therefore, in such situations, it is also desirable to employ an airlift pump that will not clog.

Embodiments of airlift pumps of the invention can be constructed with pipe sections of far greater than one inch in diameter. Embodiments of airlift pumps of the invention employ a novel design that prevents the clogging associated with other airlift pumps, such as those described in U.S. Pat. No. 6,162,020. Embodiments of airlift pumps of the invention may be used in combination and may be used along with other components to create systems for applications such as, for example, wastewater treatment.

SUMMARY

The invention is directed to non-clogging airlift pumps that may be used in various applications such as, but not limited to, general liquid pumping, wastewater mixing, aeration, wastewater treatment membrane fouling control, intermittent bubble generation, and skimming. Embodiments of airlift pumps of the invention may be used in combination and may be used along with other components to create more complex systems.

Non-clogging airlift pumps according to the invention generally include an enclosed air tank within which is disposed a hollow cylinder that forms a compartment within the air tank. The cylinder has an open top, and is substantially closed at the bottom except for a drain port that may be associated with a downwardly projecting drain tube of some length. The drain port has a diameter that is less than the diameter of the open top of the cylinder. A discharge pipe has an open intake end that resides within the cylinder. The discharge pipe extends vertically upward and passes in a sealed manner through a top wall of the air tank. The discharge pipe is preferably offset from the drain port in the cylinder such that the two are not axially aligned. A portion of the discharge pipe may be attached to an inner wall of the cylinder. Depending on the use of the airlift pump, an open discharge end of the discharge pipe may be located above or below the surface of a liquid medium in which the airlift pump is placed.

One, or possibly a plurality of substantially horizontally-oriented suction tubes, may pass in a sealed manner through side walls of the air tank and extend substantially horizontally outward therefrom. The suction tubes may be provided with one or several suction holes through the side walls thereof that allow liquid and other materials residing therein to be drawn into the suction tubes and into the air tank during operation of the airlift pump.

A source of pressurized gas (e.g., air from a blower or compressor) is attached to the air tank, such as via a supply line. The supplied gas accumulates in the air tank, displaces the liquid residing therein, and is intermittently released from the discharge end of the discharge pipe. The release of air and upward movement of the bubble expels the liquid in the discharge pipe. When the discharge end of the discharge pipe is submerged in the liquid, this release of air also results in the release of an air bubble from the discharge pipe. As the accumulated air rushes out of the discharge pipe, equilibrium (continuity) effects cause an inrush of liquid, such as via the suction tube(s), which liquid takes the place of the expelled air. The air tank is thus refilled with liquid and the cycle repeats (as long as air continues to be supplied).

Unlike previous airlift pump designs, use of optional, elongated suction tubes, can produce a secondary and more substantial expulsion of water from the discharge pipe. Particularly, after the initial discharge of the air bubble and water from the discharge pipe, inertia causes water in the horizontal suction tubes to rush into the air tank and cylinder, and to be forcefully discharged from the discharge pipe. By arranging the airlift pump such that such horizontal suction tubes are adjacent to accumulations of debris, contaminants, etc., within the liquid, and by placing a plurality of suction holes in the suction tubes, the inertial movement of water in the suction tubes can also draw a great deal of such materials into the airlift pump, where it can be expelled from the discharge pipe along with the liquid.

Also unlike previous airlift pump designs, airlift pumps of the invention may be constructed using conduit (e.g., pipe) of much larger diameter. Consequently, a larger bubble may be emitted from the discharge pipe in the case of a mixing application, which increases the mixing effectiveness of the bubble as it rises through the liquid medium. The use of larger diameter pipes also prevents airlift pumps from clogging like known airlift pumps that are constructed using pipes of one inch diameter or less. The use of larger diameter pipes also allows for the creation of much greater suction forces and the suction movement of liquid at a higher velocity.

Certain embodiments may be directed to systems wherein one or more airlift pumps are located within a larger enclosure, such as a concrete or other enclosure, and further wherein the enclosure design forces intake water to be drawn from a location that is some distance above the surface upon which the enclosure rests.

Certain embodiments may be directed to systems wherein one or more airlift pumps are located within a larger enclosure, such as a concrete or other enclosure, and further wherein a portion of the enclosure includes a filtering screen through which intake water is drawn. The screen resides at a location that is some distance above the surface upon which the enclosure rests. The screen may be cleaned of accumulated debris by periodic discharges from one or more airlift pumps.

Other aspects and features of the invention will become apparent to those skilled in the art upon review of the following detailed description of exemplary embodiments along with the accompanying drawing figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 8A is a top view and FIG. 8B is a side view of an exemplary airlift pump like that schematically illustrated in FIG. 7B;

FIGS. 15A-15B schematically represent the mixing effect produced within a fluid-filled tank by an exemplary airlift pump operating in an alternate possible mode; and FIGS. 16A-16B schematically represent the mixing effect produced within a fluid-filled tank by a plurality of exemplary airlift pumps arranged to have overlapping effective mixing zones.

DETAILED DESCRIPTION OF EXEMPLARY EMBODIMENT(S)

Figures 3, 4, 5:
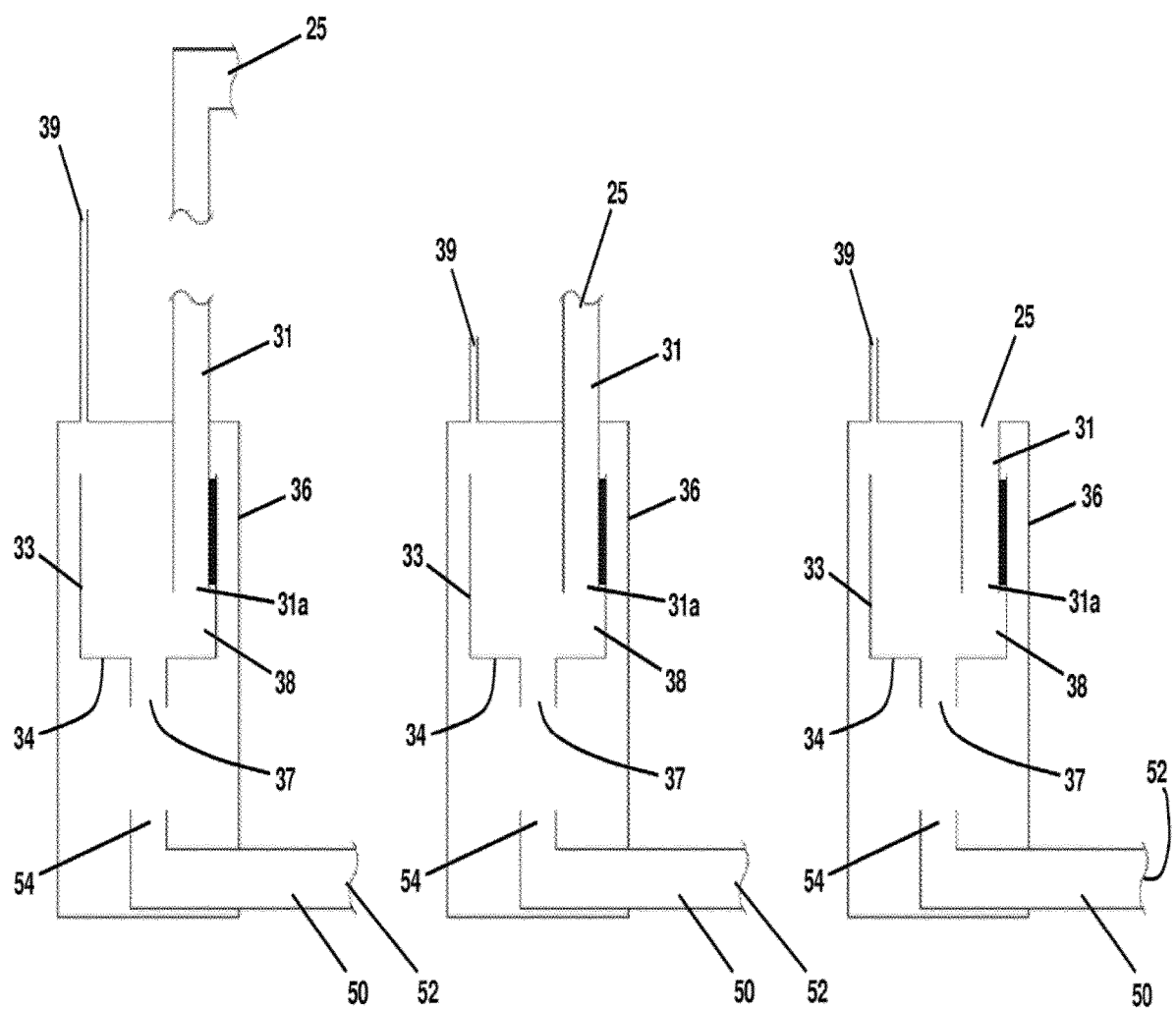
FIGS. 3-5 schematically illustrate three exemplary embodiments of a non-clogging airlift pump of the invention.

One exemplary embodiment of a non-clogging airlift pump (hereinafter airlift pump) according to the invention is schematically illustrated in FIG. 3. As shown, the airlift pump includes an enclosed air tank 36 within which is disposed a cylinder 33 that forms a compartment within the air tank. In this particular embodiment, the cylinder 33 is concentrically arranged within the air tank 36 but may be non-concentrically arranged in other embodiments. The cylinder 33 has an open top, and a bottom wall 34 that is substantially closed except for a drain port 37 that may be associated with a downwardly projecting drain pipe of some length. In this embodiment, the drain port 37 is centered within the bottom wall 34 of the cylinder 33 and has a diameter that is less than the diameter of the open top of the cylinder 33. In other embodiments, the drain port 37 may be offset from the central axis of the cylinder 33. The downwardly projecting drain pipe may vary in size, but good performance has been achieved when the diameter and length of the drain pipe is substantially equivalent to the diameter of the drain port.

A vertically-oriented discharge pipe 31 is also provided and passes in a sealed manner through a top wall of the air tank 36. The discharge pipe 31 has an open intake end 31a that resides within the cylinder 33 at a location that results in a gap 38 between the intake end and the bottom wall 34 of the cylinder. The gap 38 may vary in dimension. However, it has been determined that too small of a gap 38 creates significant surface tension between the liquid and the bottom wall 34 of the cylinder 33, while too large of a gap can significantly and undesirably reduce the effective volume (i.e., the amount by which the liquid level rises when the liquid refills the air tank). In this regard, it has been determined that the gap 38 should be approximately equal to or less than the diameter of the discharge pipe 31—with the aforementioned considerations taken into account.

Figure 1C:
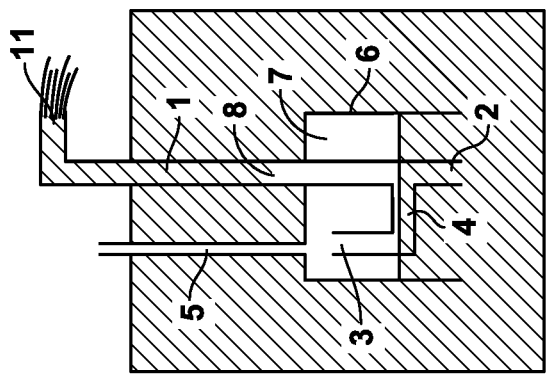
FIGS. 1A-1C schematically depict a known airlift pump and its operation while submerged within a liquid medium.
Figure 1B:
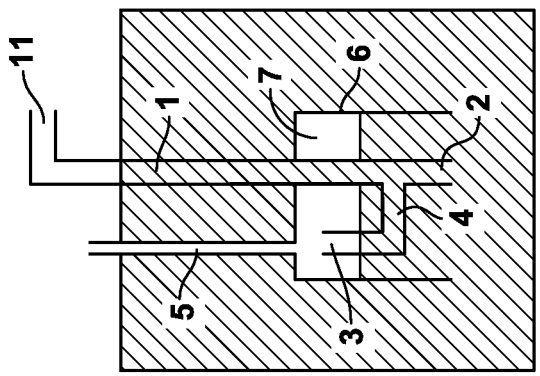
Figure 1A:
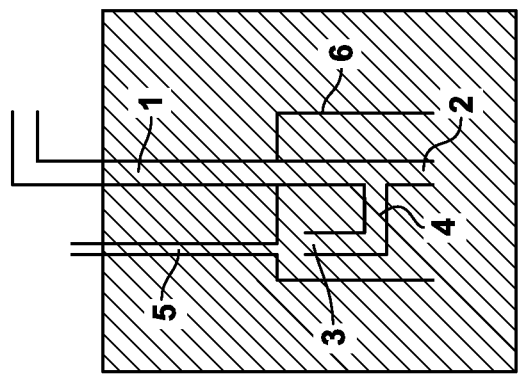
Figure 2C:
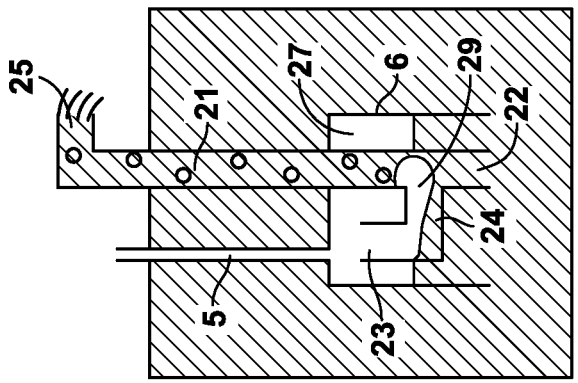
FIGS. 2A-2C schematically depict an airlift pump of the same general design as the airlift pump of FIGS. 1A-1C and its operation while submerged within a liquid medium, but wherein the airlift pump employs various components of larger diameter that result in undesirable operation.
Figure 2B:
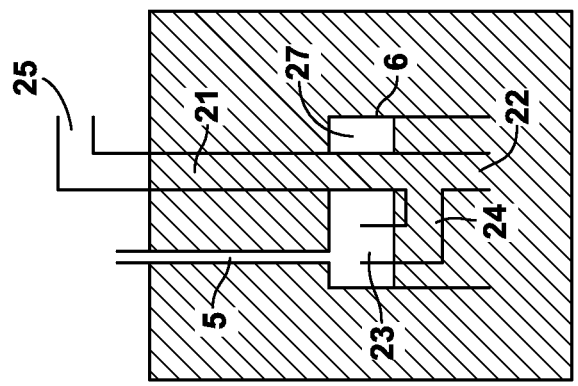
Figure 2A:
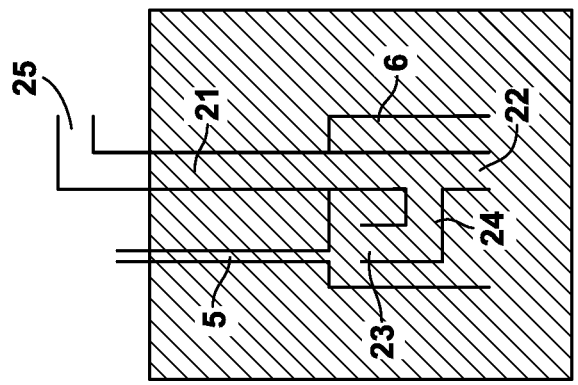

The location of the discharge pipe 31 is preferably offset from the location of the drain port 37 in the cylinder 33 by some distance such that the two are not axially aligned. For example, it is preferred that the discharge pipe 31 and drain port 37 be axially offset as far as possible, but at least by an amount substantially equal to the diameter of the discharge pipe. Among other things, this helps to avoid the excess drainage problem described above with respect to the airlift pump shown in FIGS. 2A-2C by causing draining liquid to travel along a more circuitous path. In certain embodiments, however, it may be possible to reduce the amount of axial offset even to the point of some overlap of the discharge pipe 31 and drain port 37 by adjusting the diameter ratio thereof.

It has been further found that employing a drain port 37 having a diameter that is substantially the same as or less than the diameter of the discharge pipe 31 produces good results. Similarly, while it may be possible for an airlift pump of the invention to have a drain port 37 without a drain pipe, the use of a drain pipe has been found to assist with proper refilling of the air tank 37 and cylinder 33 with liquid, as is described in more detail below. The ratio of various other component diameters may vary, as well. For example, in at least certain embodiments, the diameter of the cylinder 33 is made to be at least three times the diameter of the discharge pipe 31.

Depending on the use of the airlift pump, an open discharge end 25 of the discharge pipe 31 may be located above or below the surface of a liquid medium in which the airlift pump is placed. A portion of the discharge pipe 31 may be attached to an inner wall of the cylinder 33, as shown.

One, or possibly a plurality of substantially horizontally-oriented suction tubes, may also optionally form a part of an air lift pump of the invention. In this particular embodiment, a single suction tube 50 passes in a sealed manner through the side wall of the air tank 36 and extends substantially horizontally outward therefrom. The suction tube 50 may be provided with one or several suction holes through its side wall.

A source of pressurized gas (e.g., air from a blower or compressor) is attached to the air tank, via a supply line 39. As will be explained in more detail below, the gas accumulates in the air tank 36 and displaces the liquid residing therein during pump operation.

The airlift pump of FIG. 3 is configured to lift liquid to a location that is above the surface of a liquid medium within which the airlift pump is submerged. As such, the airlift pump of FIG. 3 is provided with an extended discharge pipe.

An alternative embodiment to the airlift pump of FIG. 3 is shown in FIG. 4. This embodiment of the airlift pump is substantially the same as the airlift pump of FIG. 3, except that the discharge pipe 31 is shorter in length. Such an airlift pump might be used, without limitation, in a wastewater treatment membrane fouling control application or in another application where the discharge end 25 of the discharge pipe 31 resides below the surface of the liquid medium within which the airlift pump is submerged.

Another alternative embodiment to the airlift pump of FIG. 3 is shown in FIG. 5. This embodiment of the airlift pump is also substantially the same as the airlift pump of FIG. 3, except that the discharge pipe 31 terminates such that the open discharge end 25 thereof is located in the top wall of the air tank 36. Such an airlift pump might also be used, for example, in a wastewater treatment membrane fouling control application, in a mixing, aeration, or bubbling application, or in another application where the discharge end 25 of the discharge pipe 31 resides below the surface of the liquid medium within which the airlift pump is submerged.

While an airlift pump design like that shown in FIG. 5 is possible, it is noted that extending the discharge pipe 31 above the air tank 36 by some amount (as is shown in FIG. 4) reduces the pressure exerted by the overlying liquid medium at the discharge end 25 of the discharge pipe. Consequently, the flow of liquid into the discharge pipe 31 from the discharge end 25 thereof is reduced, which likewise results in a reduced flow of liquid into the air tank 36 in a contrary direction to the flow of liquid entering the air tank via the suction tube 50.

Unlike previous airlift pump designs, the airlift pumps shown in FIGS. 3-5 use an optional, elongated suction tube 50. The suction tube 50 includes an intake end 52 that resides outside of the air tank 36 and may be completely open, partially open, or sealed. A discharge end 54 of the suction tube 50 resides within the air tank 36 at a level that is below that of the suction port. In practice, such a suction tube may be constructed of two or more sections. For example, a section containing the discharge end 54 may be pre-installed within the air tank and designed to permit easy connection thereto of the section of the suction tube 50 residing externally to the air tank.

The suction tube 50 may be of different lengths. For example, when the pipe diameter used to construct an airlift pump embodiment of the invention is 2 inches or greater, it has been found that the length of the suction tube can be as much as 100 feet or more. In any case, during operation of an airlift pump equipped with one or more such suction tubes 50, a secondary and more substantial expulsion of water from the discharge pipe is produced. This phenomenon is described in more detail below.

The suction tubes 50 may be provided with one or several suction holes (not shown) through the side walls thereof that allow liquid and other materials residing therein to be drawn into the suction tubes and into the air tank 36 during operation of the airlift pump. Such suction holes would be present when the intake end 52 of the suction tube 50 is sealed, and may also be present when the intake end of the suction tube 50 is partially or completely open.

When present, the suction holes may be provided in various numbers and may be of various shapes and sizes as deemed appropriate for the liquids and possibly other materials residing therein to be pumped. The suction holes may also be arranged in various patterns. The number, shape and pattern of the suction holes present may also vary from one suction tube 50 to another.

The combination of the cylinder 33, discharge pipe 31 and drain port 37 may be referred to generally as a separator, as this collection of components acts to separate air and liquid (e.g., water in which the airlift pump is submerged) as explained in more detail below. The term "separator" may be used below with respect to other airlift pump embodiments, even though the design and construction thereof may be somewhat different from that shown in FIGS. 3-5.

Airlift pumps of the invention may be constructed using conduit (e.g., pipe) of much larger diameter. For example, experiments have been conducted with airlift pumps having internal conduit diameters of between 4-12 inches and air tank diameters of up to 36 inches. Other diameters are also possible, and the above examples are not to be considered limiting.

As previously mentioned, the use of larger diameter conduit means that a larger bubble may be emitted from the submerged discharge pipe of an airlift pump of the invention. This increases the mixing effectiveness of the bubble as it rises through the liquid medium. The use of larger diameter conduit also prevents airlift pumps of the invention from clogging when solids and other materials present in the liquid medium are drawn into the air tank 36—as is described above as being a problem with respect to known airlift pumps that are constructed using pipes of one inch diameter or less.

Alternative airlift pump embodiments other than those shown and described herein are also possible. As one non-limiting example, it is possible to pass the suction pipe(s) of an airlift pump through the bottom wall of the air tank rather than through a side wall.

Airlift pumps of the invention may be manufactured from a variety of materials depending on the liquid medium in which they will be submerged. For example, while plastic materials such as PVC are typically ideal, it is also possible to employ, without limitation, fiberglass, composites, metal, concrete, and wood.

Figure 6A:
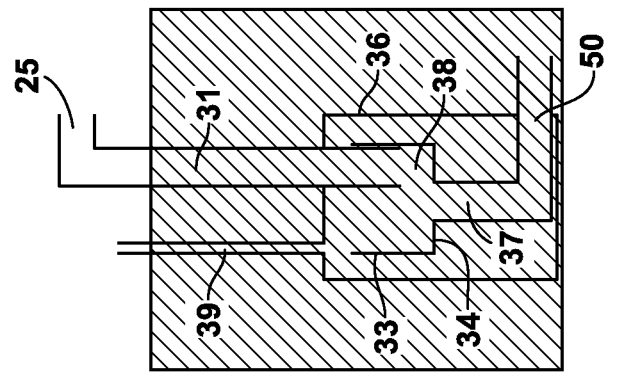
FIGS. 6a-6c schematically illustrate the operation of the exemplary airlift pump of FIG. 3 while submerged in a liquid medium.
Figure 6B:
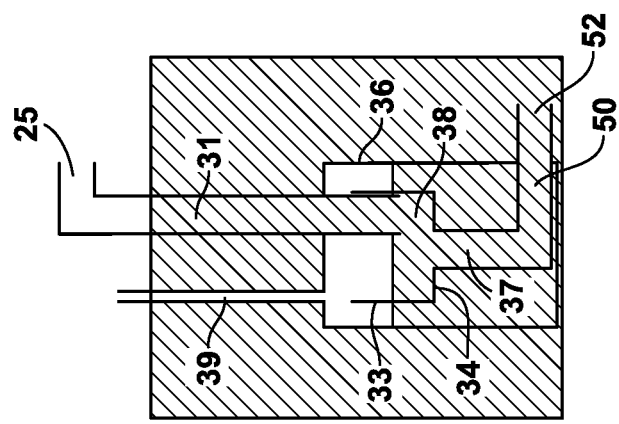
Figure 6C:
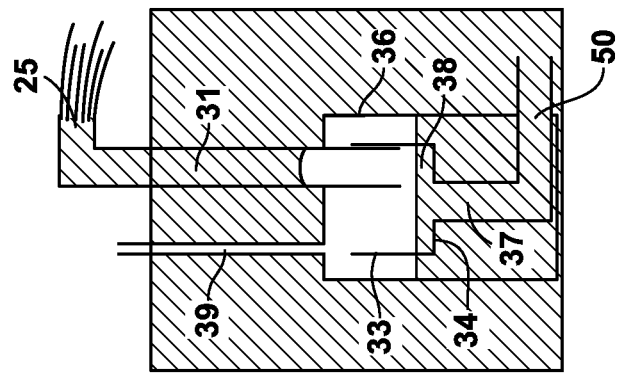

Operation of an airlift pump of the invention can be better understood by observation of FIGS. 6A-6C and a study of the following written description. While the airlift pump shown in FIGS. 6A-6C is substantially the same as the airlift pump depicted in FIG. 3, it should be realized that the basic operation of any airlift pump embodiment according to the invention would be similar.

Referring initially to FIG. 6A, it can be understood that all but a portion of the discharge pipe 31 of the airlift pump is submerged in a liquid of interest such that the air tank 36, the cylinder 33, the discharge pipe 31, the suction pipe 50, etc., is flooded by the liquid. A pressurized gas (e.g., air) from a gas source (e.g., a blower or compressor) is then introduced to the air tank 36 via the air line 39.

As shown in FIG. 6B, gas accumulates in the air tank 36 as gas continues to be supplied from the pressurized gas source. The accumulated gas air forces the level of the liquid in the air tank 36 downward, causing the displaced liquid to be expelled from the intake end 52 of the suction tube 50.

The level of the liquid within the cylinder 33 continues to be displaced downward until it reaches the gap 38 between the intake end 31a of the discharge pipe 31 and the bottom wall 34 of the cylinder 33, as shown in FIG. 6C. At this point, accumulated gas is released and a bubble is formed. The bubble travels upward within the discharge pipe 31, forcing liquid still residing in the air tank 36 upward into the discharge pipe and causing the liquid level within the discharge pipe to rise. Rising of the bubble causes an ejection of the liquid from the discharge end 25 of the discharge pipe 31 and also produces suction at the intake end 52 of the suction tube 50. As the bubble continues to rise, it becomes larger and the suction force at the intake end of the suction tube increases.

After the initial discharge of the gas bubble and liquid from the discharge pipe 31, inertia causes liquid in the horizontal suction tube 50 to rush into the air tank 36 and cylinder 33, and to be forcefully discharged from the discharge pipe 31. When the liquid medium is water, it may travel within the suction tube 50 at a velocity of 20 feet/second or greater as a result of inertial flow.

More particularly, when the liquid level in the air tank 36 is forced upward at some speed $V_C$, liquid is sucked into the suction port 37 and the liquid residing in the suction tube 50 is drawn toward the air tank. The period of liquid movement (suction) toward the air tank 36 depends on the height of the air tank. For a typical size range of air tanks for example, the suction effect may last for between about 1/16 of one second for a short air tank to about 1/2 of one second for a tall air tank. Other suction periods are possible for air tanks of other dimensions.

After initial movement of the liquid residing in the suction tube 50 toward the air tank 36, inertia forces cause the liquid to continue to move in the same direction, even if no further suction force exists in the air tank 36. The liquid entering the air tank 36 from the suction tube 50 flows toward the discharge pipe 31. The flow of liquid from the suction tube 50 into the air tank 36 helps to push the bubble upward in the discharge pipe 31.

The inertial flow of liquid from the discharge tube 50 into the air tank 36 is an extremely economical way to transfer liquid. The kinetic energy and momentum of the liquid may be calculated as:

Kinetic energy=$LA_S\rho g V_S^2/2$

Momentum=$LA_S\rho g V_S$ where $A_S$ is the suction port area, $\rho$ is the density of the liquid, g is the gravity coefficient, and $V_S$ is the velocity in the suction tube 50. From these equations, it is obvious that no inertia flow will occur when the suction tube length L is zero.

The velocity of the liquid flowing into the discharge pipe 31 as a result of inertial flow may obviously vary. However, when experimenting with airlift pumps of the invention within various real-world size ranges, and with water as the liquid medium, the velocity of liquid flowing into the discharge pipe 31 as a result of inertial flow has been observed to be at least about 6 feet/second, and more commonly 12 feet/second or more. Further, as the bubble in the discharge pipe is pushed upward by the inertially flowing liquid, the velocity of bubble becomes far larger than the terminal velocity (for water) shown in Table 1 below. When the bubble velocity is enhanced and a bubble is released into a liquid medium, agitation by the wake created directly below the bubble is increased significantly.

| Bubble diameter [inch] | Terminal velocity [inch/sec] |
| --- | --- |
| 1 | 11 |
| 2 | 15 |
| 4 | 22 |
| 6 | 29 |
| 10 | 44 |

The amount of liquid discharged by inertial flow can be significant, depending on the volume of the horizontal suction tube 50. Consequently, it should be understood that by arranging the airlift pump such that the horizontal suction tube 50 is adjacent to accumulations of sludge, debris, other solids, etc., within the liquid, and by placing a plurality of suction holes in the suction tube, the inertial flow of liquid in the suction tube can also draw a great deal of such materials into the airlift pump where it can be thereafter expelled from the discharge pipe 31 along with the liquid. This can have the effect of continuously circulating sludge, etc., within a liquid medium, or of removing solids from a liquid medium.

In addition to causing an increased expulsion of liquid from the discharge pipe 31, the liquid sucked into the suction tube 50 also refills the air tank 36 and cylinder 33, generally at least until the liquid reaches the intake end 31a of the discharge pipe 31. When entering the air tank 36, the liquid flows outward and upward, passing through the gap between the walls of the cylinder 33 and air tank 36 and flowing into the cylinder through the open top thereof. The use of a discharge pipe helps to properly guide the liquid during refilling and reduces upward pressure effects that might be exerted on the drain port 37 by the liquid. Liquid generally does not flow into the cylinder through the drain port 37.

By causing the air tank 36 and cylinder 33 to be refilled in this manner and by continuously introducing gas into the air tank, gas and liquid are intermittently discharged whenever the liquid level in the air tank is forced down to the level of the gap 38 between the intake end 31a of the discharge pipe 31 and the bottom wall 34 of the cylinder 33. In other words, an airlift pump of the invention automatically recycles after each burst of aerated liquid when continuously supplied with gas. Consequently, air lift pumps of the invention may be used in a variety of applications where a repeating liquid pumping function is desired.

Figures 7A, 7B, 7C:
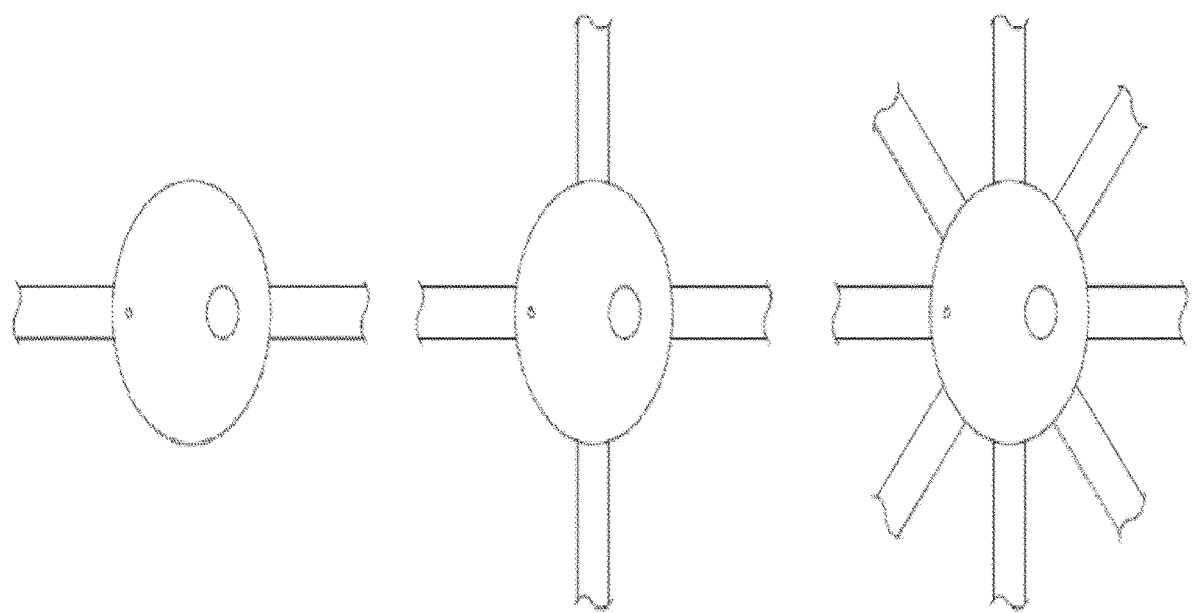
FIGS. 7A-7C are schematic and partial top views of different variations of the airlift pump depicted in FIG. 4.

The airlift pumps of FIGS. 3-5 are each shown to have only one suction tube 50. However, it is to be understood that an airlift pump embodiment of the invention may have a plurality of such suction tubes. Several exemplary embodiments of airlift pumps with multiple suction tubes are schematically represented in FIGS. 7A-7C to illustrate this point. Each of the airlift pumps shown in FIGS. 7A-7C uses the basic airlift pump design of FIG. 4 for purposes of simplicity, but other constructions may also be employed such as, without limitation, the constructions shown in FIG. 3 and FIG. 5. Still other variations are also possible, and nothing shown or described herein is to be interpreted as limiting the number or arrangement of suction tubes used.

A better understanding of such an airlift pump design may be gained by further reference to FIGS. 8A-8B, which provide for more detailed views of an airlift pump like that schematically depicted in FIG. 7B. This exemplary airlift pump 60 can be seen to include a separator 62 located within an air tank 64. Four suction tubes 66, each having a multitude of suction holes 68 extend outward from the air tank 64. In this embodiment, the suction tubes 66 are substantially equidistantly spaced about the air tank 64, but such need not be the case. Anchoring elements 70, 72 may be provided to anchor the air tank 64 and/or the suction tubes 66 to a surface. Operation of the airlift pump 60 is as generally described above in regard to FIGS. 6A-6B.

Figure 9:
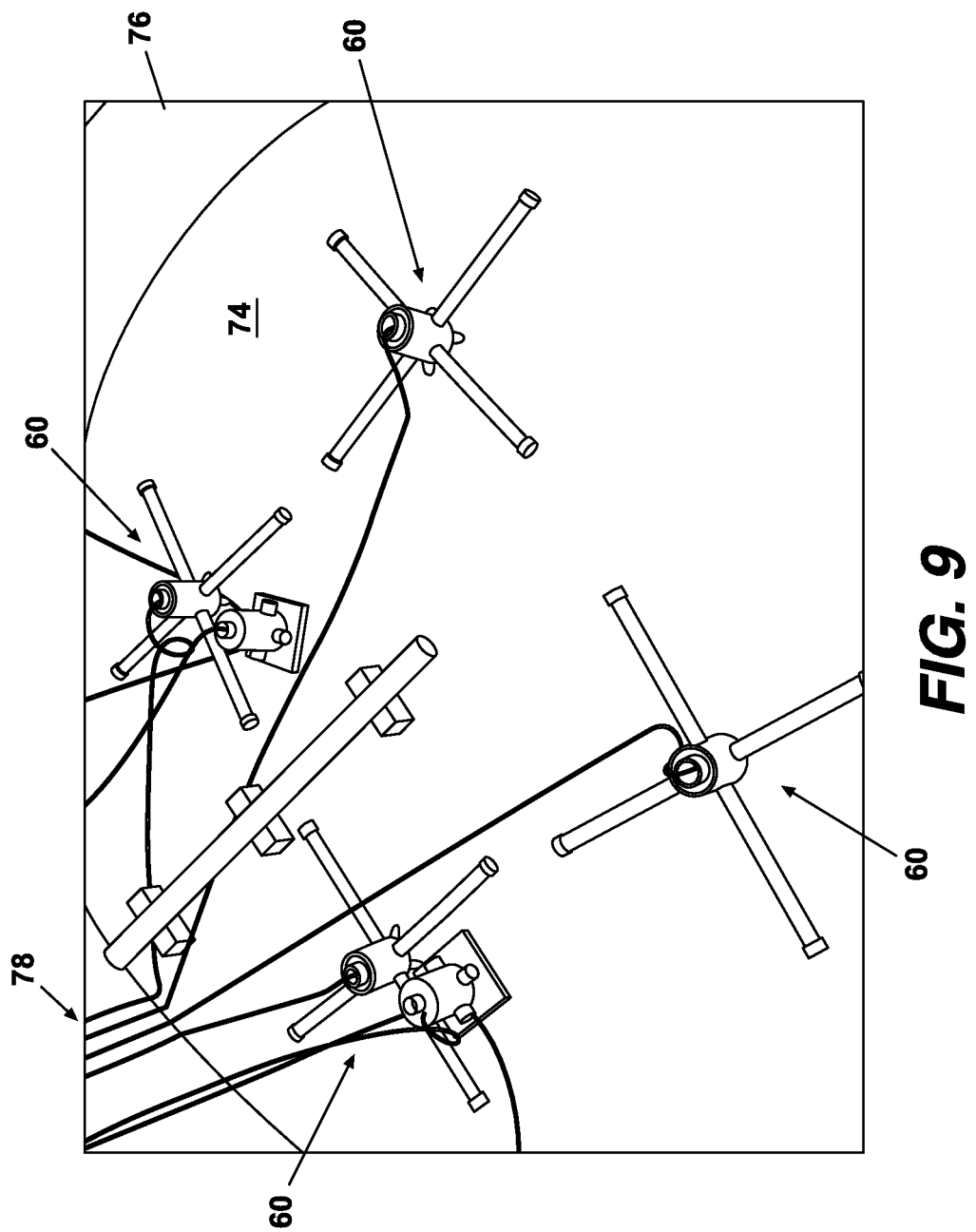
FIG. 9 depicts an exemplary installation of a plurality of the airlift pumps of FIGS. 8A-8B installed in a mixing application within a sewage treatment tank.

A plurality of the airlift pumps 60 of FIGS. 8A-8B are shown in FIG. 9 to be arranged along the bottom 74 of an empty tank 76. Air lines 78 lead to each airlift pump 60 from a location outside the tank 76. Arranging the airlift pumps 60 in this manner ensures a thorough mixing of the fluid that will eventually fill the tank 76 and submerge the airlift pumps 60. That is, such an arrangement ensures an overlap of the effective mixing zones of each of the airlift pumps 60, as is illustrated in FIGS. 16A-16B.

Figure 10:
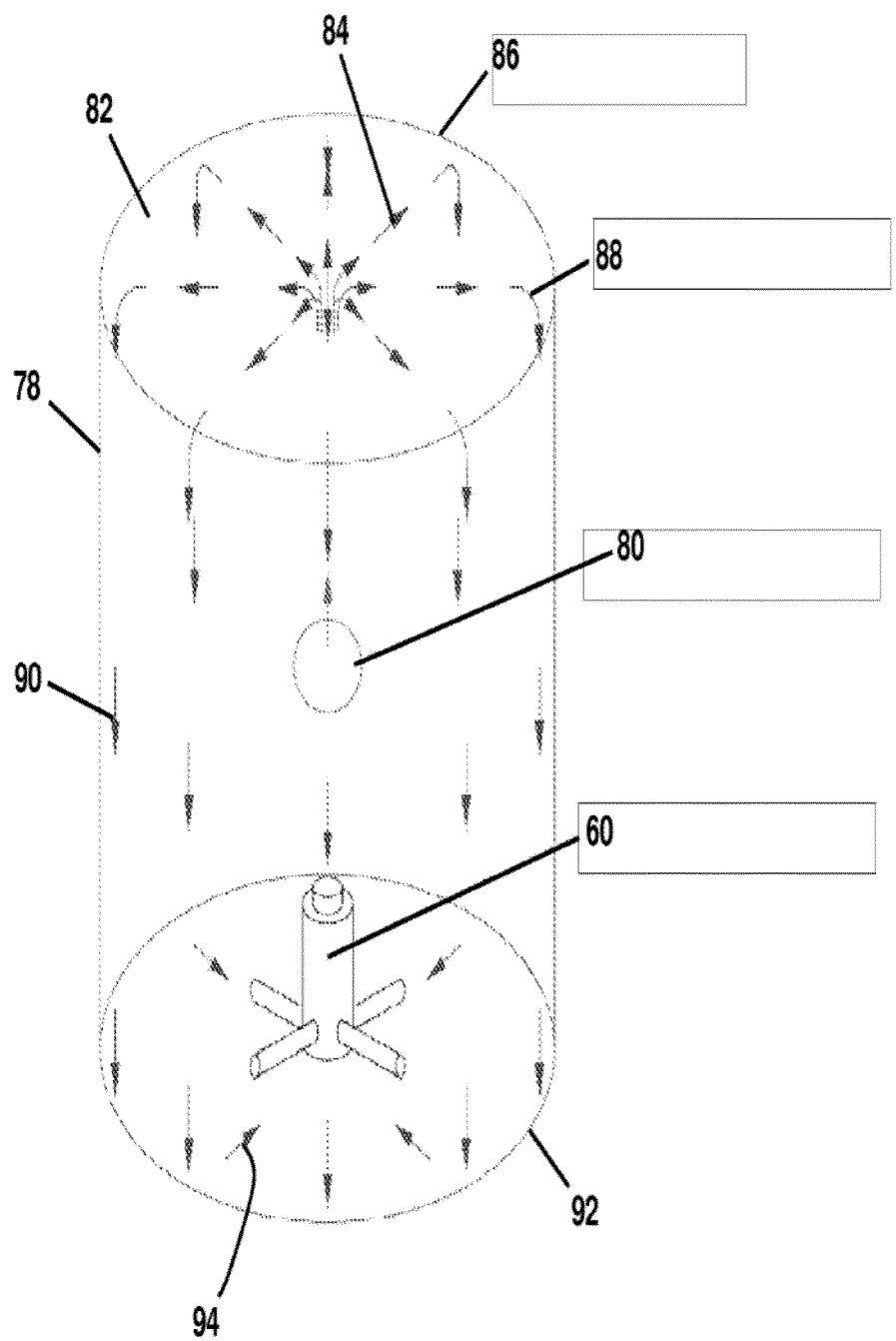
FIG. 10 schematically illustrates a mixing effect that may be achieved by installing an airlift pump embodiment of the invention in a fluid-filled tank.

The general mixing effect caused by a properly-sized airlift pump according to the invention is schematically illustrated in FIG. 10. Although FIG. 10 depicts use of the airlift pump 60 for purposes of illustration, the mixing effect may be the same for other properly sized airlift pump embodiments—whether or not said airlift pumps are equipped with suction tubes.

The airlift pump 60 is located in an open-top tank 78 in FIG. 10. As illustrated, the manner of operation of this exemplary pump 60 results in the generation of a large air bubble 80 that is released from the pump and rises to the surface 82 of the liquid in the tank 78. Upon reaching the surface 82 of the liquid, the bubble 80 produces a current (as represented by the arrows 84 at the liquid surface) that travels outward equally in all directions from the surfacing point of the bubble. In this example, the airlift pump 60 is properly sized so that the effective mixing zone produced by the current at the liquid surface 82 will reach the tank wall 86. In other embodiments (see, e.g., FIGS. 16A-16B), the effective mixing produced by the current at the liquid surface may collide with currents produced by bubbles from other airlift pumps, the collision of the current fronts having a similar effect to the collision of the current front with the tank wall of FIG. 10, as described below.

When the current at the liquid surface 82 reaches the tank wall 86, the direction of the current is turned downward (as represented by the arrows 88). The current will then travel to the bottom of the tank 78, where contact with the bottom wall 92 of the tank will turn the current inward (as represented by the arrows 94) toward the airlift pump 60. This movement of the bubble-produced currents within the tank 78 causes a thorough mixing of the liquid in the tank and also acts to stir up any sludge and/or other debris that has collected along the bottom of the tank.

Figure 11A:
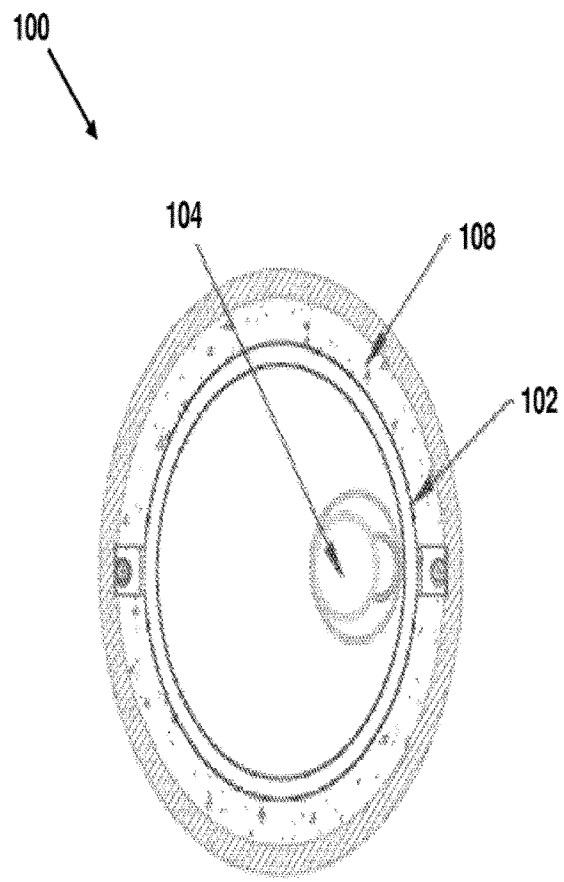
FIG. 11A is a top plan view and FIG. 11B is a cross-sectional side view of an alternate embodiment of an airlift pump according to the invention.
Figure 11B:
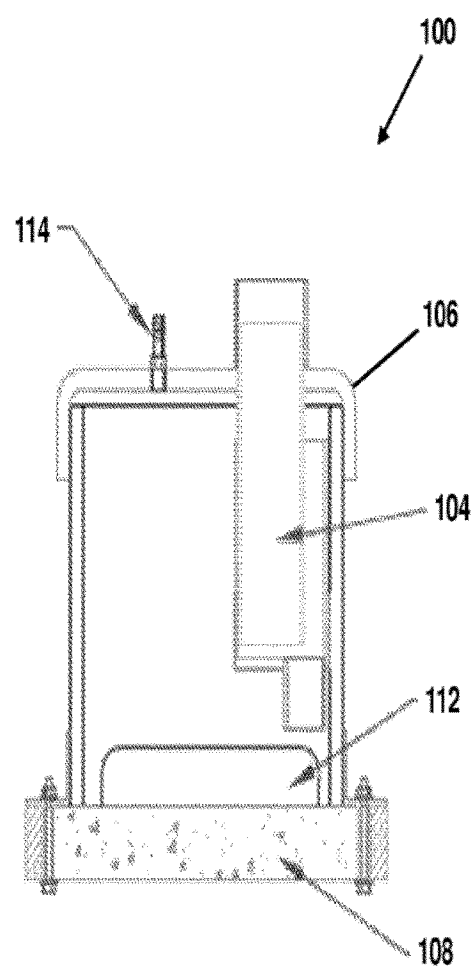

Another alternative exemplary embodiment of an airlift pump 100 is depicted in FIGS. 11A-11B. This airlift pump 100 again includes an air tank 102, within which is located a separator 104. The air tank 102 is closed along the top by a lid 106 and is attached at the bottom to an anchoring plate 108, such as a concrete weight that helps to prevent buoyancy of the airlift pump when air is introduced to the air tank. Consequently, both the top and bottom of the conduit used to form the air tank 102 are closed, except for a vertically-oriented discharge pipe 110 that passes in a sealed manner through the lid 106 of the air tank 102. An air introduction port 114 also passes in a sealed manner through the lid 106 of the air tank 102.

This exemplary embodiment of the airlift pump 100 is devoid of laterally extending suction tubes. Rather, in this embodiment, liquid intake into the air tank 102 occurs through one or more inlet ports 112 that are located in the side wall of the air tank, preferably along the bottom thereof. Operation of this embodiment of the airlift pump 100 is otherwise as generally described with respect to the airlift pump of FIGS. 6A-6C.

Figure 12A:
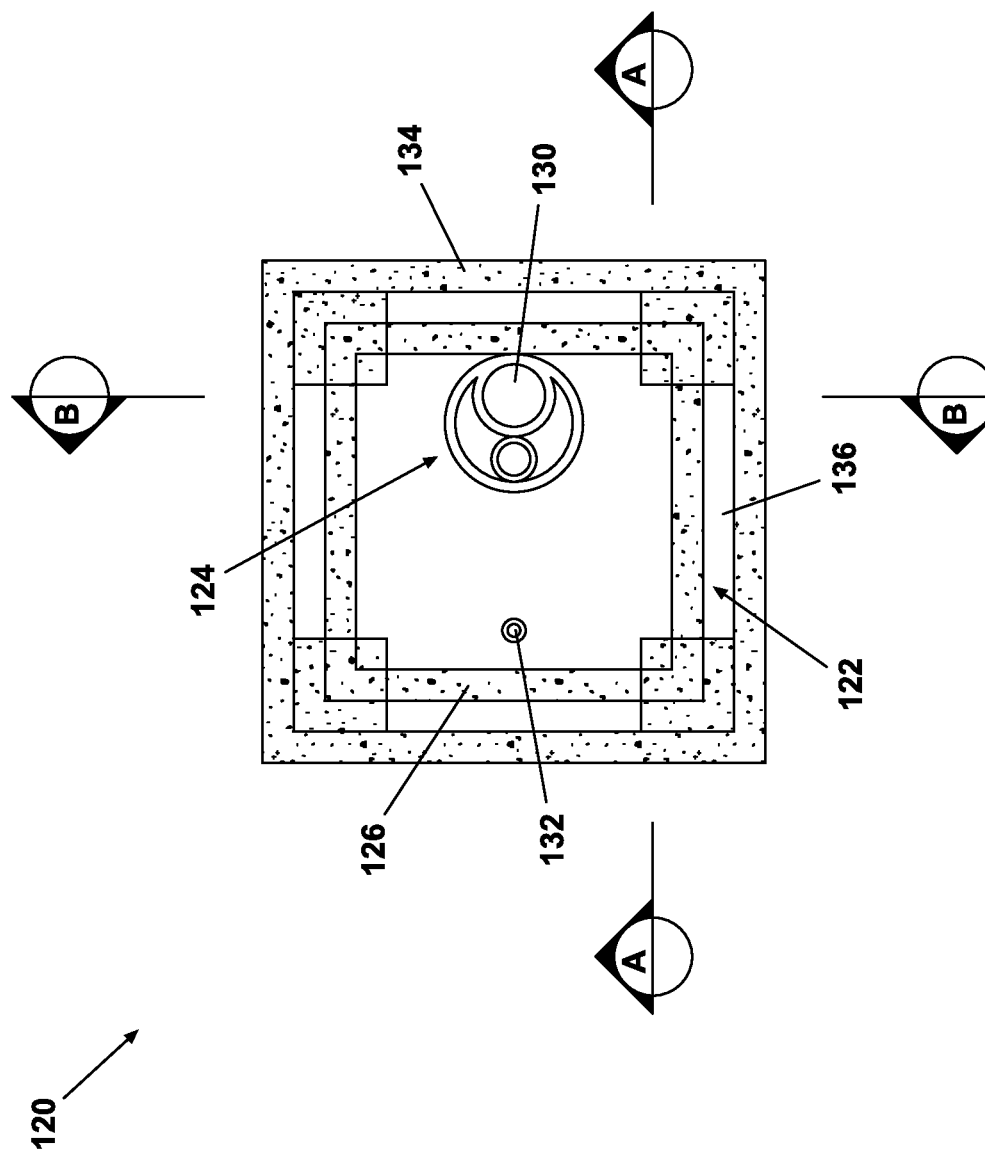
FIGS. 12A-12C are top plan and cross-sectional side views, respectively, depicting an exemplary system according to the invention wherein an airlift pump is located within an enclosure having a water intake port located some distance above the surface upon which the enclosure rests.
Figure 12C:
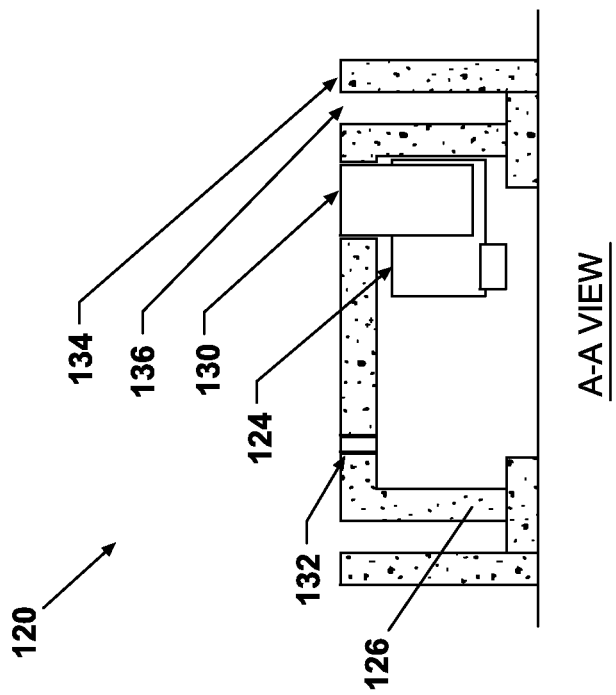
Figure 12B:
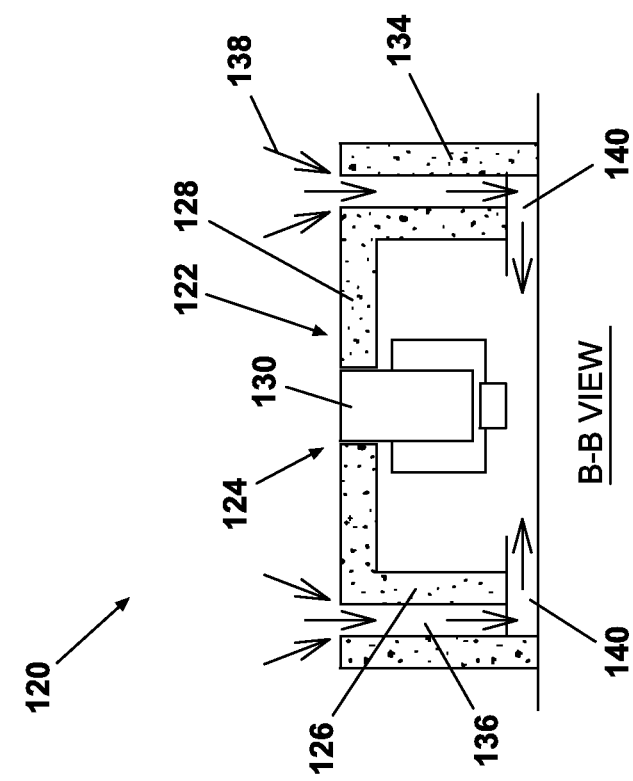

Another alternative exemplary embodiment of an airlift pump 100 is depicted in FIGS. 12A-12C. This airlift pump 120 again includes an air tank 122, within which is located a separator 124. However, unlike previously described exemplary embodiments where the air tank is a simple conduit (e.g., a section of plastic pipe), the air tank 122 of this exemplary embodiment is in the form of a larger enclosure. In fact, as shown in FIGS. 12A-12C, this particular exemplary air tank 122 is a concrete box having upstanding side walls 126 and a top wall 128. Constructing the air tank 122 from concrete or a similar material is cost effective and will, again, also help to prevent buoyancy of the airlift pump 120 when air is introduced to the air tank. A discharge port 130 passes in a sealed manner through the top wall 128 of the air tank 122, as does an air introduction port 132.

This exemplary embodiment of the airlift pump 120 is also devoid of laterally extending suction tubes. Rather, in this embodiment, the air tank 122 is located within the confines of upstanding bounding walls 134 that surround the side walls 126 of the air tank with a space 136 therebetween. Preferably, the space 136 exists around the entirety of the air tank side walls 126, but such may not be the case in all embodiments. The height of the bounding walls 134 may be the same as the height of the air tank side walls 126, or the heights may differ. The enclosure formed by the bounding walls 134 is open at the top—i.e., there is no top wall associated with the bounding walls. In other embodiments, a discharge tube(s) (not shown) may be connected to the discharge port 130 and extend outward away from the air tank/enclosure and bounding walls 134. When present, such a discharge tube(s) may extend substantially horizontally or at some other angle with respect to the surface upon which the airlift pump 120 rests. The use of such a discharge tube(s) allows an air bubble(s) to be released at a location(s) that is at some distance from the discharge port 130.

In this embodiment of the air lift pump 120, water intake into the air tank 122 occurs through the space 136 that exists between the bounding walls 134 and the side walls 126 of the air tank. Consequently, liquid is drawn through the space 136 (as indicated by the arrows 138) and into the air tank 122 from a location at or above the height of the bounding walls 134. This prevents, or at least minimizes, the intake of sludge and/or other debris in comparison to other airlift pump embodiments where liquid is drawn from near the bottom of a tank or other structure within which the airlift pump is located. At least one inlet port 140 is provided through the side walls 126 of the air tank 122, such as providing one or more gaps along the base thereof. Once liquid is drawn into the air tank 122 and air is supplied thereto via the air introduction port 132, operation of the airlift pump 120 is otherwise as generally described with respect to the airlift pump of FIGS. 6A-6C.

Figure 13A:
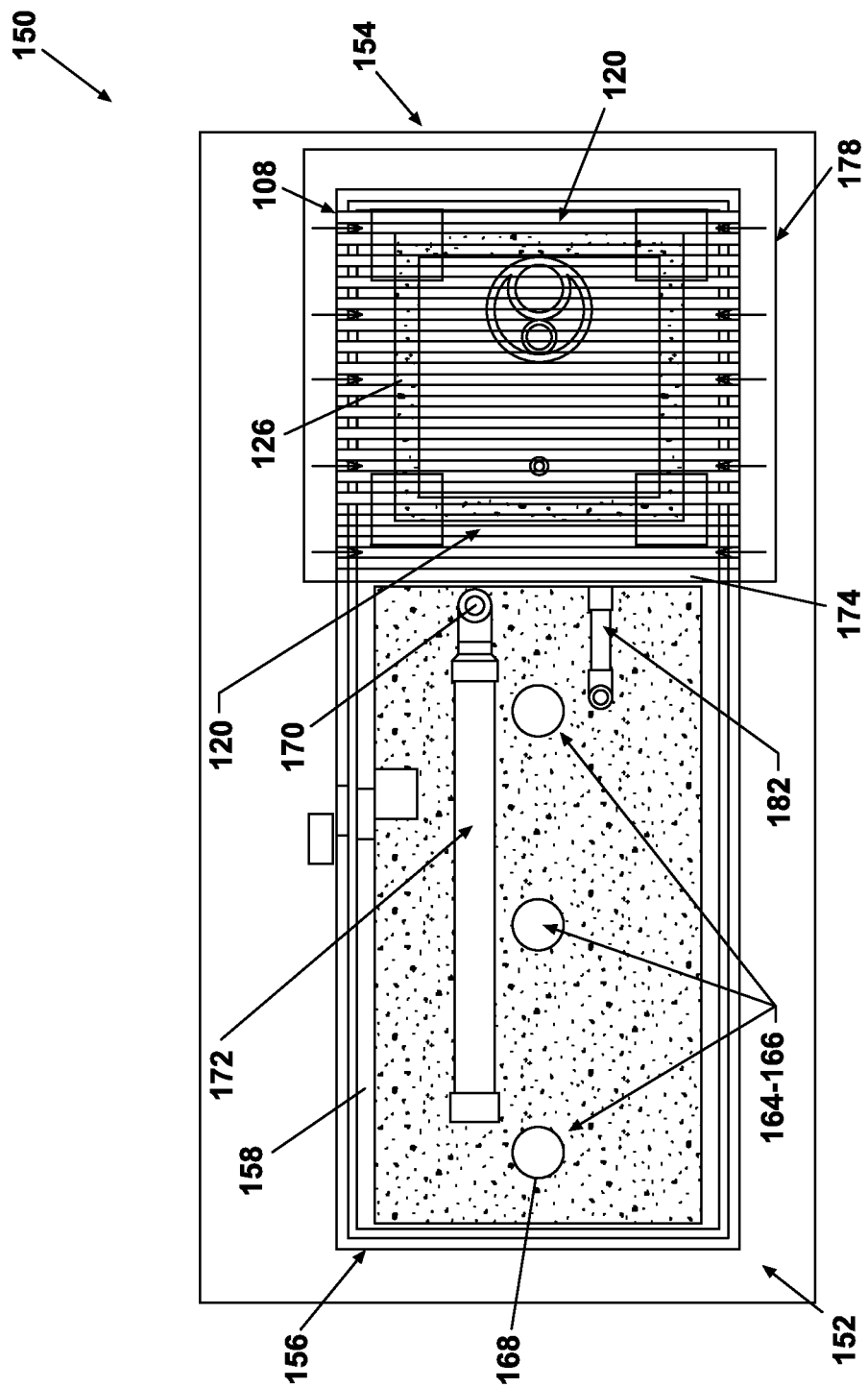
FIG. 13A is a top plan view and FIG. 13B is a cross-sectional side view of an alternate embodiment of an exemplary system according to the invention wherein a plurality of airlift pumps are located within an enclosure having a water intake chamber, and wherein a filtering screen overlies the water intake chamber.
Figure 13B:
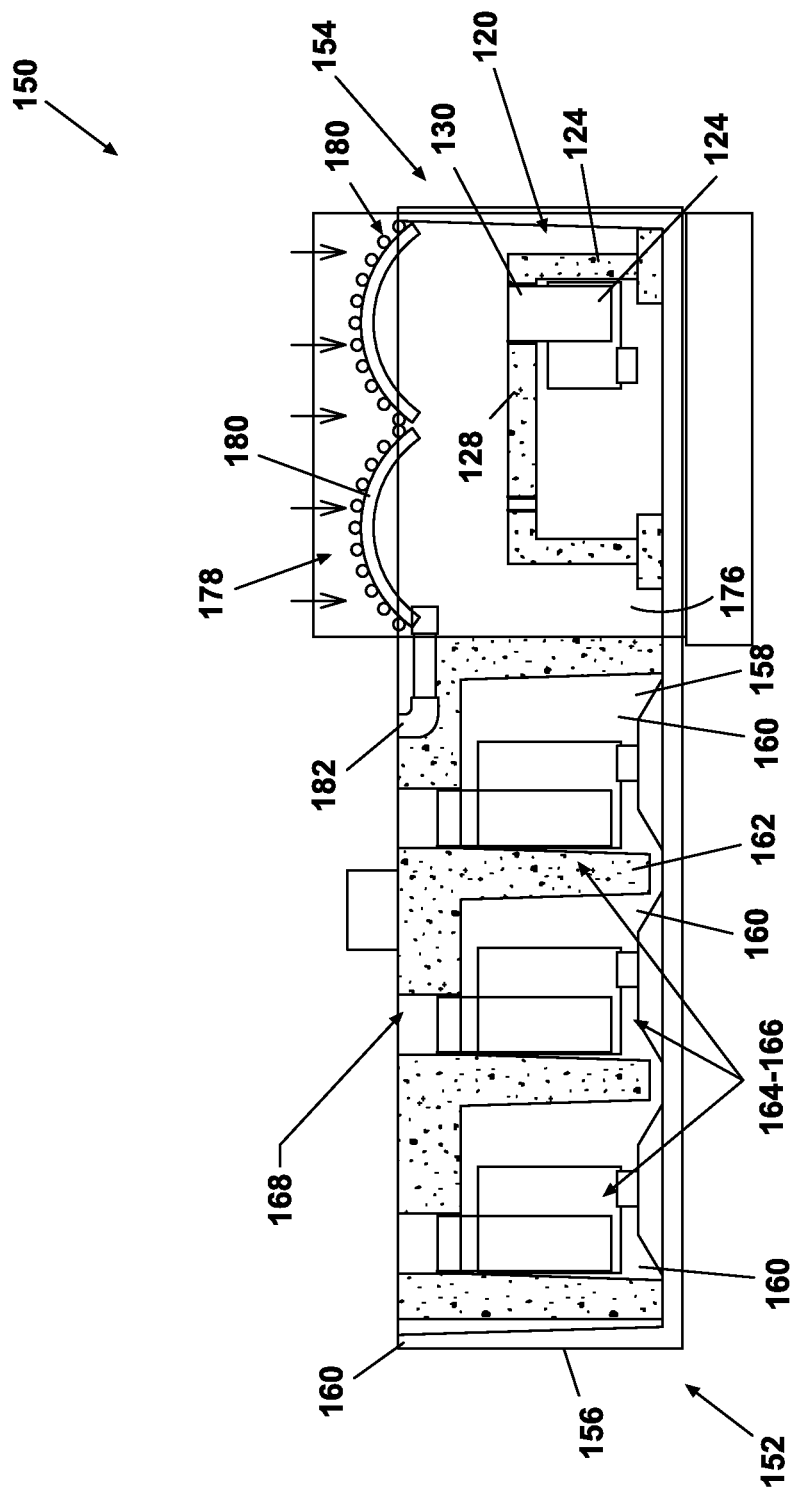

An exemplary embodiment of a mixing system 150 is depicted in FIGS. 13A-13B. The mixing system 150 is a dual function system in that it includes a first, pump section 152, for providing a mixing or other function and a second, screened and aerated intake section 154, for the intake of liquid into the pump section. In this exemplary embodiment, the pump section 152 and the intake section 154 are separated but located within a common primary enclosure 156. Separate but at least hydraulically connected enclosures may be employed in other embodiments.

The pump section 152 of this exemplary pump system 150 includes a plurality of interconnected air tanks 158 which, in this case, are formed by compartments 160 in the primary enclosure 156. As shown, this exemplary primary enclosure 156 may be substantially solid except for the partitioned hollow compartments 160 (air tanks). A plurality of downwardly-extending walls 162 may be provided to form the compartments 160. Each air tank 158 includes a separator 164, 165, 166. The separators 164-166 and air tanks 158 combine to create three separate pump section airlift pumps.

The separators 164-166 and, therefore, the pumps section airlift pumps, may or may not be identical to one another. Also, a fewer or greater number of pump section airlift pumps may be utilized in other embodiments. A discharge port 168 of each airlift pump separator passes in a sealed manner through the top of the primary enclosure 156, as does the air introduction port 170 of an air header 172 associated with the pump section 152. Although not apparent in FIGS. 13A-13B, the air header 172 (except for the air introduction port 170 thereof) of this exemplary embodiment is actually encased in the concrete or other material used to form the primary enclosure 156. The air header 172 distributes air to the compartments 160 that form the air tanks 158.

The intake section 154 of this particular system embodiment is also located within the primary enclosure 156, but has an open top. The pump section 152 and the intake section 154 are divided by a separating wall 174 through which liquid from the intake section may be passed to the pump section, such as by openings, ports, etc., in the separating wall.

In this embodiment, the intake section is shown to include the airlift pump 120 of FIGS. 12A-12C, but without the bounding walls 134. Rather, the air tank 122 simply resides within the compartment 176 formed by the walls of the primary enclosure 156 and the separating wall 174. Other embodiments may include other intake section airlift pump embodiments. An air intake conduit 182 is provided to supply air to the air introduction port of the intake section airlift pump 120.

One or more filtering screens, indicated generally at 178, overlie the open top of the intake compartment 176 and function to filter debris, sludge, etc., from the liquid during intake thereof. In this embodiment, the filtering screens 178 are provided in the form of arcuate grids 180, but other screen types and shapes are certainly possible and may be selected at least in part based on the type of debris present in the liquid. Because it is contemplated that debris, sludge, etc., may eventually clog the filtering screens 178, the intake section airlift pump 120 may be operated to dislodge such debris, etc., by releasing air bubbles that will rise upward through the filtering screens. In other words, the filtering screens 178 may be aerated by the airlift pump 120 during operation of the system. To this end, the intake section airlift pump 120 may be relocated from the position shown in FIGS. 13A-13B so as to be more centrally disposed beneath the filtering screens 178. Alternatively, a split conduit network, a divider, and/or other structures may be provided to ensure that air bubbles released by the intake section airlift pump 120 acceptably clean all of the filtering screens present.

In this embodiment of the pumping system 150, liquid intake is forced to occur through the filtering screens 178. Consequently, liquid is again drawn from a location at or above the height of the enclosure walls 160. This again prevents, or at least minimizes, the intake of sludge and/or other debris in comparison to other airlift pump embodiments where liquid is drawn from near the bottom of a tank or other structure within which the airlift pump is located.

Upon passing through the filtering screens, the liquid enters the intake compartment 176 and flows under the walls 126 of the intake section airlift pump 120 and into the air tank 122 thereof, etc., as described above. Liquid also flows through the separating wall 174 and into the pump section 152 and the air tanks 158 and separators 164-166 of the pump section airlift pumps.

Once liquid is drawn into the pump section airlift pumps and air is supplied thereto via the air introduction port 170, operation of the pump section airlift pumps occurs as generally described with respect to the airlift pump of FIGS. 6A-6C. Similarly, once liquid is drawn into the air tank 122 of the intake section airlift pump 120 and air is supplied thereto via the air introduction port 132, operation of the intake section airlift pump 120 also occurs as generally described with respect to the airlift pump of FIGS. 6A-6C. The pump section airlift pumps and the intake section airlift pump 120 may be operated concurrently and with the same timing, or the timing of the intake section airlift pump and the pump section airlift pumps may be different.

Figure 14A:
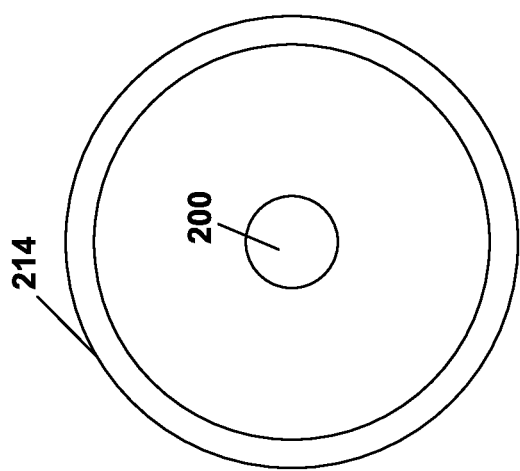
FIGS. 14A-14B schematically represent the mixing effect produced within a fluid-filled tank by an exemplary airlift pump operating in one possible mode.
Figure 14B:
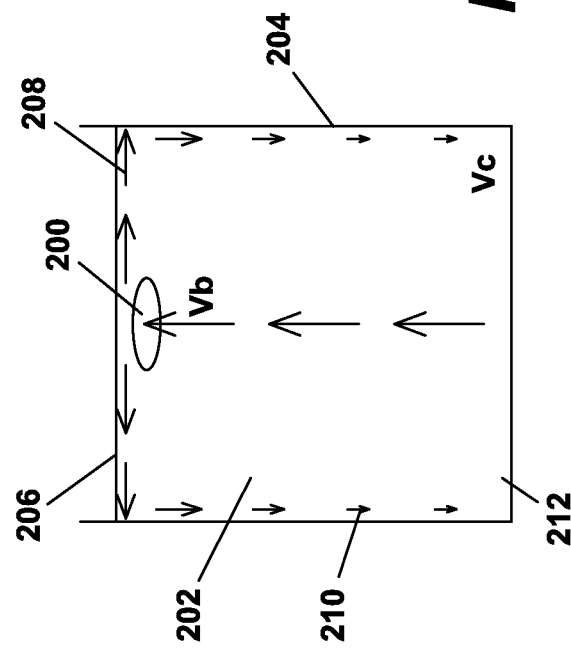

FIGS. 14A-14B and 15A-15B illustrate different techniques for ensuring proper mixing of a given liquid volume. The mixing effect represented in FIGS. 14A-14B is similar to that described above with respect to FIG. 10. Particularly, FIGS. 14A-14B represent an airlift pump releasing a large air bubble 200 into a liquid volume 202 contained with a tank 204. The air bubble 200 rises to the surface 206 of the liquid in the tank 204, where it produces a current (as represented by the arrows 208 at the liquid surface) that travels outward equally in all directions from the surfacing point of the bubble. The effective mixing zone 214 produced by the current at the liquid surface 206 is, in this case, larger than the tank diameter. Therefore, the current reaches the tank wall 204 and is turned downward (as represented by the arrows 210) until it reaches the bottom of the tank 204, where the current is turned inward (as represented by the arrows 212) toward the center of the tank. This movement of the bubble-produced currents within the tank 204 causes a thorough mixing of the liquid in the tank and also acts to stir up any sludge and/or other debris that has collected along the bottom of the tank.

The mixing effect represented in FIGS. 15A-15B is similar to that described above with respect to FIGS. 14A-14B, except that a series of smaller bubbles 220 is released into a liquid volume 222 contained within a tank 224, and at a greater frequency. The air bubbles 220 rise to the surface 226 of the liquid in the tank 224, where the bubbles produce a current (as represented by the arrows 228 at the liquid surface) that travels outward equally in all directions from the surfacing point of the bubbles. The effective mixing zone 234 produced by the current at the liquid surface 226 is, in this case, larger than the tank diameter. Therefore, the current reaches the tank wall 224 and is turned downward (as represented by the arrows 230) until it reaches the bottom of the tank 224, where the current is turned inward (as represented by the arrows 232) toward the center of the tank. This movement of the bubble-produced currents within the tank 224 causes a thorough mixing of the liquid in the tank and also acts to stir up any sludge and/or other debris that has collected along the bottom of the tank.

FIGS. 16A-16B represent the mixing effect caused by an arrangement of several airlift pumps. The mixing effect represented in FIGS. 16A-16B is similar to that described above with respect to FIGS. 14A-14B, except that multiple airlift pumps are arranged in a larger liquid-filled tank such that the collective mixing effect thereof is sufficient to mix the liquid within the whole of the tank.

As schematically represented in FIGS. 16A-16B, a large air bubble 240 has been released into a liquid volume 242 contained with a tank 244. Each air bubble 240 rises to the surface 246 of the liquid in the tank 244, where it produces a current (as represented by the arrows 248 at the liquid surface) that travels outward equally in all directions from the surfacing point of the bubble. The effective mixing zone 250 produced by the current generated at the liquid surface 246 by each bubble is, in this case, smaller than the tank diameter. However, a portion of the current produced by each bubble 240 reaches the tank wall 244 while the current fronts traveling in other directions collide with each other so as to form overlapping effective mixing zones. The currents are turned downward along the tank walls and along the collision fronts (as represented by the arrows 252) until they reach the bottom of the tank 244, where the currents are turned inward toward the center of the tank (as described above). This movement of the bubble-produced currents within the tank 244 causes a thorough mixing of the liquid in the tank and also acts to stir up any sludge and/or other debris that has collected along the bottom of the tank.

While certain exemplary embodiments of the invention are described in detail above, the scope of the invention is not to be considered limited by such disclosure, and modifications are possible without departing from the spirit of the invention as evidenced by the following claims:

What is claimed is:

1. A non-clogging airlift pump powered mixer, comprising:
   an enclosed air tank;
   a gas input line operatively passing into the enclosed air tank;
   a hollow cylinder located within the enclosed air tank, the hollow cylinder having an open top and a bottom wall wherein the open top is disposed within the enclosed air tank;
   a drain port passing through the bottom wall of the hollow cylinder; and
   a substantially vertically oriented discharge pipe passing in a sealed manner through a top wall of the enclosed air tank, an intake end of the discharge pipe being within the hollow cylinder above the bottom wall of the hollow cylinder and below the top wall of the enclosed air tank;
   a gas accumulation region is defined by a region between the top wall of the enclosed air tank and the intake end of the discharge pipe; wherein gas passes into the gas accumulation region from the gas input line and accumulates in the gas accumulation region forcing a liquid level in the gas accumulation region downward away from the top wall of the enclosed air tank, the accumulated gas is discharged through the discharge pipe only when the accumulated gas reaches the intake of the discharge pipe, wherein the discharge pipe is not co-axial with the hollow cylinder.

2. The airlift pump powered mixer of claim 1, wherein the discharge pipe extends beyond a top wall of the enclosed air tank.

3. The airlift pump powered mixer of claim 1, wherein the drain port includes a drain tube extending downward a distance from the bottom wall of the hollow cylinder toward the bottom of the enclosed air tank; wherein the bottom wall of the hollow cylinder is closed except for the drain port.

4. The airlift pump powered mixer of claim 1, wherein the discharge pipe is adjacent to and attached to an inner wall of the hollow cylinder.

5. The airlift pump powered mixer of claim 1 wherein the drain port is centered within the bottom wall of the hollow cylinder.

6. The airlift pump powered mixer of claim 1, further comprising at least one suction tube having a discharge end, the suction tube passing into the enclosed air tank through a side wall of the enclosed air tank, such that the discharge end of the suction tube resides within the enclosed air tank below the drain port, wherein the bottom wall of the hollow cylinder is closed except for the drain port.

7. The airlift pump powered mixer of claim 1, wherein the discharge pipe is axially offset from the drain port.

8. The airlift pump powered mixer of claim 1, wherein the discharge pipe is not co-axial with a discharge end of a suction tube.

9. The airlift pump powered mixer of claim 1, wherein a discharge end of the discharge pipe is proximate the top wall of the enclosed air tank.

10. The airlift pump powered mixer of claim 1, wherein the airlift pump powered mixer is positioned within a tank containing fluid and generates intermittent bubbles that mix the fluid as the bubbles rise from the airlift pump powered mixer within the tank containing fluid.

11. The airlift pump powered mixer of claim 1, wherein the accumulated air within the hollow cylinder escapes substantially about the entire circumference of a terminal end of the discharge pipe.

* * * * *